(12) United States Patent
Huston

(10) Patent No.: US 8,417,261 B2
(45) Date of Patent: Apr. 9, 2013

(54) GPS BASED FRIEND LOCATION AND IDENTIFICATION SYSTEM AND METHOD

(76) Inventor: Charles D. Huston, Austin, TX (US)

( * ) Notice: Subject to any disclaimer, the term of this patent is extended or adjusted under 35 U.S.C. 154(b) by 0 days.

(21) Appl. No.: 13/188,030

(22) Filed: Jul. 21, 2011

(65) Prior Publication Data
US 2011/0282799 A1  Nov. 17, 2011

Related U.S. Application Data

(63) Continuation of application No. 11/624,998, filed on Jan. 19, 2007, which is a continuation-in-part of application No. 11/456,715, filed on Jul. 11, 2006, now Pat. No. 7,855,638, and a continuation-in-part of application No. 11/456,723, filed on Jul. 11, 2006, now Pat. No. 7,518, 501.

(60) Provisional application No. 60/699,205, filed on Jul. 14, 2005.

(51) Int. Cl.
*H04W 24/00* (2009.01)
(52) U.S. Cl.
USPC ............ 455/456.1; 455/404.2; 455/456.2; 455/456.3; 455/456.4; 455/456.5; 345/633; 345/634; 345/635; 345/636; 345/653
(58) Field of Classification Search ........... 455/404.2, 455/456.1–456.6; 345/633–636, 653, 659; 709/219; 705/14.66, 14.67
See application file for complete search history.

(56) References Cited

U.S. PATENT DOCUMENTS

| | | |
|---|---|---|
| 5,364,093 A | 11/1994 | Huston et al. |
| 5,802,492 A | 9/1998 | DeLorme et al. |
| 6,115,177 A | 9/2000 | Vossler |
| 6,166,679 A | 12/2000 | Lemelson et al. |
| 6,195,090 B1 | 2/2001 | Riggins, III |
| 6,317,127 B1 | 11/2001 | Daily et al. |

(Continued)

FOREIGN PATENT DOCUMENTS

| | | |
|---|---|---|
| EP | 1262213 | 12/2002 |
| EP | 1113669 | 7/2011 |

(Continued)

OTHER PUBLICATIONS

O'Malley et al., "Human Activity Tracking for Wide-Area Surveillance," University of Florida, Department of Electrical and Computer Engineering, May 2002, 7 pages.

(Continued)

*Primary Examiner* — Olumide T Ajibade Akonai
*Assistant Examiner* — Edward Zhang
(74) *Attorney, Agent, or Firm* — Charles D. Huston; Daffer McDaniel, LLP

(57) ABSTRACT

A system and method for observing a personal networking event which shares the position of a number of friendly participants with other participants within a group. In one form, the position of unknown participants meeting certain criteria is also displayed to a user or one or more friendly participants. The views are selectable by friendly participants on, for example, a GPS equipped cell phone, to include a view from the participant's position, zoom, pan, and tilt views, or views from another friendly location or from another geographic location, giving increased situational awareness and identification of participants. Other information can be shared among friendly participants, including social information, status and directions.

31 Claims, 6 Drawing Sheets

U.S. PATENT DOCUMENTS

| | | | |
|---|---|---|---|
| 6,330,356 B1 | 12/2001 | Sundareswaran et al. | |
| 6,411,266 B1 | 6/2002 | Maguire, Jr. | |
| 6,452,544 B1 | 9/2002 | Hakala et al. | |
| 6,578,203 B1 | 6/2003 | Anderson, Jr. et al. | |
| 6,671,390 B1 | 12/2003 | Barbour et al. | |
| 6,721,542 B1 | 4/2004 | Anttila et al. | |
| 6,744,403 B2 | 6/2004 | Milnes et al. | |
| 6,801,516 B1 | 10/2004 | Lomp et al. | |
| 6,879,443 B2 | 4/2005 | Spitzer et al. | |
| 6,885,652 B1 | 4/2005 | Ozukturk et al. | |
| 6,894,994 B1 | 5/2005 | Grob et al. | |
| 6,909,738 B2 | 6/2005 | Akopian et al. | |
| 6,917,644 B2 | 7/2005 | Cahn et al. | |
| 6,920,328 B2 | 7/2005 | Wollrab | |
| 6,996,402 B2* | 2/2006 | Logan et al. | 455/456.1 |
| 7,002,551 B2 | 2/2006 | Azuma et al. | |
| 7,031,728 B2 | 4/2006 | Beyer, Jr. | |
| 7,053,780 B1 | 5/2006 | Straub et al. | |
| 7,123,215 B2 | 10/2006 | Nakada | |
| 7,209,035 B2 | 4/2007 | Tabankin et al. | |
| 7,317,705 B2 | 1/2008 | Hanson | |
| 7,353,034 B2* | 4/2008 | Haney | 455/457 |
| 7,441,198 B2* | 10/2008 | Dempski et al. | 715/757 |
| 7,546,317 B1 | 6/2009 | Kaptelinin | |
| 7,593,687 B2 | 9/2009 | Anderson, Jr. et al. | |
| 7,812,766 B2 | 10/2010 | Leblanc et al. | |
| 2002/0154174 A1 | 10/2002 | Redlich et al. | |
| 2002/0188678 A1 | 12/2002 | Edecker et al. | |
| 2003/0032436 A1 | 2/2003 | Mikuni | |
| 2003/0174178 A1 | 9/2003 | Hodges | |
| 2003/0187730 A1 | 10/2003 | Natarajan et al. | |
| 2004/0036622 A1 | 2/2004 | Dukach et al. | |
| 2004/0051680 A1 | 3/2004 | Azuma et al. | |
| 2004/0104935 A1 | 6/2004 | Williamson et al. | |
| 2005/0078195 A1 | 4/2005 | VanWagner | |
| 2005/0107952 A1 | 5/2005 | Hoshino et al. | |
| 2005/0143096 A1* | 6/2005 | Boesch | 455/456.3 |
| 2005/0148388 A1 | 7/2005 | Vayra et al. | |
| 2005/0207617 A1* | 9/2005 | Sarnoff | 382/103 |
| 2005/0250458 A1 | 11/2005 | Graham et al. | |
| 2005/0259002 A1 | 11/2005 | Erario et al. | |
| 2006/0104600 A1 | 5/2006 | Abrams | |
| 2006/0105857 A1 | 5/2006 | Stark | |
| 2006/0136173 A1 | 6/2006 | Case et al. | |
| 2006/0195361 A1 | 8/2006 | Rosenberg | |
| 2006/0262140 A1 | 11/2006 | Kujawa et al. | |
| 2007/0024527 A1 | 2/2007 | Heikkinen et al. | |
| 2007/0103292 A1 | 5/2007 | Burkley et al. | |
| 2007/0150444 A1* | 6/2007 | Chesnais et al. | 707/3 |
| 2007/0179792 A1 | 8/2007 | Kramer | |
| 2007/0255831 A1 | 11/2007 | Hayashi et al. | |
| 2007/0265089 A1 | 11/2007 | Robarts et al. | |
| 2008/0194323 A1 | 8/2008 | Merkli et al. | |

FOREIGN PATENT DOCUMENTS

| | | |
|---|---|---|
| KR | 10-2004-0047692 | 6/2004 |
| KR | 10-2005-0055506 | 6/2005 |
| WO | 01/05476 | 1/2001 |
| WO | 01/36061 | 5/2001 |

OTHER PUBLICATIONS

Barstow et al., "Personalized Interactive Real-Time Sports Reporting Using Java," American Programmer, Jan. 1997, pp. 32-37.
International Search Report, PCT/US2006/027218, mailed Feb. 12, 2007.
Office Action mailed Apr. 14, 2009 for U.S. Appl. No. 11/456,715.
Final Office Action mailed Dec. 28, 2009 for U.S. Appl. No. 11/456,715.
Office Action mailed Mar. 16, 2010 for U.S. Appl. No. 11/456,715.
Notice of Allowance mailed Oct. 4, 2010 for U.S. Appl. No. 11/456,715.
Office Action mailed Apr. 17, 2008 for U.S. Appl. No. 11/456,723.
Final Office Action mailed Oct. 1, 2008 for U.S. Appl. No. 11/456,723.
Notice of Allowance mailed Dec. 15, 2008 for U.S. Appl. No. 11/456,723.
Office Action mailed Oct. 6, 2009 for U.S. Appl. No. 11/624,998.
Office Action mailed Apr. 14, 2010 for U.S. Appl. No. 11/624,998.
Office Action mailed Sep. 1, 2010 for U.S. Appl. No. 11/624,998.
Office Action mailed Feb. 15, 2011 for U.S. Appl. No. 11/624,998.
Office Action mailed Jun. 14, 2011 for U.S. Appl. No. 11/624,998.
Office Action mailed Oct. 6, 2009 for U.S. Appl. No. 11/875,414.
Final Office Action mailed Jun. 22, 2010 for U.S. Appl. No. 11/875,414.
Office Action mailed Dec. 21, 2010 for U.S. Appl. No. 11/875,414.
Final Office Action mailed Jun. 9, 2011 for U.S. Appl. No. 11/875,414.
Office Action mailed Aug. 8, 2011 for U.S. Appl. No. 12/111,688.
Office Action mailed Mar. 4, 2011 for U.S. Appl. No. 12/146,907.
Final Office Action mailed Jun. 13, 2011 for U.S. Appl. No. 12/146,907.
Final Office Action mailed Nov. 7, 2011 for U.S. Appl. No. 11/624,998.
Office Action mailed Mar. 27, 2012 for U.S. Appl. No. 11/875,414.
Office Action mailed Jan. 4, 2012 for U.S. Appl. No. 12/146,907.
Notice of Allowance mailed Mar. 9, 2012 for U.S. Appl. No. 12/146,907.
Final Office Action mailed Jul. 24, 2012 for U.S. Appl. No. 12/111,688.
Office Action mailed Sep. 10, 2012 for U.S. Appl. No. 13/182,930.
Office Action mailed Aug. 20, 2012 for U.S. Appl. No. 13/423,423.
Office Action mailed Nov. 22, 2012 for pending KR Application No. 10-2008-7003027.

* cited by examiner

GPS BASED FRIEND LOCATION AND IDENTIFICATION SYSTEM AND METHOD

PRIORITY CLAIM

The present application is a continuation of U.S. patent application Ser. No. 11/624,998 filed Jan. 19, 2007 which is a continuation-in-part of U.S. application Ser. Nos. 11/456,715 and 11/456,723 filed Jul. 11, 2006, which both claim priority to U.S. Provisional Application No. 60/699,205 filed Jul. 14, 2005.

BACKGROUND

1. Field of the Invention

This invention relates generally to locater systems and methods, in particular, to an individual system and method which depicts other people and objects. In a preferred form, the user can change the depiction including viewing and identifying friends or people with common interests from a number of angles, locations, and magnitudes.

2. Description of Related Art

GPS systems have been used in sports by participants in contests where position, location and distance to features are important. For example, U.S. Pat. No. 5,364,093 describes a GPS system and method for allowing a golfer to tell distance to a hole or other feature, and permits the course to track and manage golfers on the course. NASCAR with Sportsline has developed a GPS system mounted to cars for TV viewers to monitor a race.

GPS Systems have been used in a threat environment by the military in a variety of applications such as navigation aids and guidance systems for ordnance. GPS Systems have also been used for training scenarios. In both the military and civilian social networking applications, GPS Systems have been used for tracking people or objects.

GPS systems are becoming much more accurate, inexpensive and robust. GPS antennas and engines are fairly inexpensive and accurate with WAAS to less than 2 meters. Accuracy is improving, especially with the increase in the number of advanced satellites and frequencies available. In a local area, the accuracy can be improved to centimeters, depending on the accuracy required, latency constraints, processing and bandwidth available, etc. Further, communication links are becoming very inexpensive and high bandwidth. For example, WiFi (802.11g) has modems with network signals approaching a 1 mile range, cost less than $5, with bandwidth of 54M bit/sec. Wi-max (802.16) has network signals approaching 30 miles with data rates as high as 70M bit/sec, but is more relevant to fixed installations Future versions of WiFi or other radio technology might be less than $1 with 10-100× bandwidths within a few years (as used herein WiFi refers to current and future versions of wireless local area networks (WLAN) based on the IEEE 802.11 specifications).

What has not been done in the sports arena is an integrated GPS system for spectators to more fully enjoy a sport. For example, at a NASCAR race, a spectator's location limits his view of the race and is his own unique perspective. While watching a race, the spectator might listen to a radio or watch a portable TV, but the perspective is the announcer's or TV angle. Such divergent perspectives—announcer versus personal—can be confusing. Further, a $3^{rd}$ turn spectator might be most interested in the cars he can see—the ones near the $3^{rd}$ turn. Other sports would benefit from a system that allows a spectator to more fully integrate the contest information with his viewing perspective. In addition to auto racing, football, yachting, horse racing, golf, hockey or any motor sport are candidates for the system and method hereof, especially as size and weight of GPS and radios accompanying a participant decreases.

What is lacking in personal networking applications, including social and business situations, is an integrated GPS system for an individual user to gain situational awareness and to easily identify friends or others of interest. That is, while a personal networking participant might possess a GPS enabled cell phone that transmits his position, this information does the individual little good. Such a personal networking participant might have an overhead view of a map showing the position of other friends in the general vicinity, but leaves it up to the participant to find and identify them.

A particular problem in the area of personal networking is identifying a person of interest in a confusing environment, such as a crowd. For example, a cell phone having a GPS might be enabled to identify that a friend is near, but the user cannot locate the friend because of the crowd or environment, e.g. a crowded street or concert. Users also have difficulty relating how a small mark identifying a friend on a map correlates to their position or their view of the situation.

U.S. Pat. No. 6,744,403 describes a GPS system for tracking objects, such as cars, at a sporting event. See also, U.S. Pat. No. 6,195,090. High data rate packet transmission is known, such as U.S. Pat. Nos. 6,894,994; 6,909,738; 6,885, 652; 6,917,644; 6,801,516. Examples of user interfaces, such as PDA's, cell phones, headsets, and the like are U.S. Pat. Nos. 7,053,780; 6,879,443 and 6,115,177. Examples of social networking devices and applications using GPS include: U.S. Pat. Nos. 7,039,435; 7,035,647; 6,912,398; 7,136,747 and U.S. Pat. App. Pub. Nos. 2006/0154687; 2004/0203595; 2006/0242234; and 2003/0236120. All references cited herein are incorporated by reference.

SUMMARY OF THE INVENTION

The present invention contemplates a GPS system that provides situational information and identifies people or objects relevant to a user's perspective or location and preferably is selectable to view the situation from another location. Preferably, the participants in a group are GPS equipped and communicate their GPS position (and other sensor or status information) with a server at a central location. For example, a circle or group of friends might be identified and each participant in the group accompanied by a GPS enabled cell phone. The cell phones preferably communicate locations through the cellular network to other authorized participants or unknown users meeting defined criteria. The user has a portable viewing device that accepts the user's position and selectively renders a view of the situation, other group participants, and optionally unknowns meeting defined criteria (and/or other information) from the user's perspective or location or selectively from another location. That is, the user can selectively view and identify other group participants and unknowns users meeting defined criteria from different locations, views, and magnification. Even remote users can use a device with a network information feed to identify group participants.

As an analogy, in a NASCAR race, the cars are all equipped with a GPS engine and a communication link to a central server. Each spectator has a portable device that has a GPS engine, as well as a communication link to the central server. The portable device logs in with the central server, optionally authenticating and telling the server the spectator's location at the track. During the race, the positions of the cars are broadcast to the spectators. In one mode, the portable device displays information most relevant to the spectator's location.

For example, the position and vital information of the cars nearest the spectator. In another mode, the portable device has the processing power to take the positions of the cars and the location of the spectator and render a depiction of the cars in real time on the track. The spectator can select the view. For example, the spectator might select "finish line," "overhead," "car 3 driver's view," or "my view."

A spectator at the $3^{rd}$ turn with "my view" selected can see the perspective of the rendering on the portable device to match his own visual observation—i.e. his location including elevation. This adds to a much greater enjoyment of the situation because visual data is added to the display which matches his visual observation. Importantly, the spectator can not only switch views, but can also tilt or pan the perspective or observation point or zoom. That is, from "my view" the spectator might rotate a toggle up incrementally up (or down) from the horizontal view from the spectator's location of the car positions to a vertical view of the situation. Preferably, the toggle would also allow left/right pan functions at any time.

Similarly, in a personal networking situation, the user and each friendly participant within a group has a portable device that has a GPS engine (e.g. GPS equipped cell phones), as well as a communication link to the central server. The portable device logs in with the central server, optionally authenticating and telling the server the user's location. The group can be determined ahead of time, or can be dynamic according to predetermined criteria. In a simple form, a user can simply identify a circle of friends as participants in the group (sometimes referred to as "friendlies" herein). During the networking situation, the positions of the user and friendly participants, as well as the estimated positions of the unknowns are communicated to the user. In one mode, the portable device displays information most relevant to the user's location. For example, the position and vital information of the friendlies nearest the user can be displayed and the positions and any other information on the unknowns within a certain range of the user can be displayed. In another mode, the portable device has the processing power to take the positions of the friendlies and unknowns and the location of the user and render a depiction and identification of the participants in real time. The user can select the view. For example, the user might select "meeting spot view," "overhead map view," "friendly #3 view," or "my view."

In addition to the view of the unknowns meeting certain criteria or friendlies the user can selectively view appended important information. For example, in one mode the user might select no information, in a second mode, the user might select unknown identification only, while in another mode, the user might select identification plus movement of unknowns, plus "social information" of one or more selected friendlies or unknowns. Such "social information" might be destination, cash available, time available, meeting or introduction desires, partner status, group, culture or music affinity, etc. Preferably, the user could go from a view mode to other modes, such as a display of the current information of the friendlies and/or unknowns in tabular form, a view from a particular location (an image or streaming video), remote sensor video or other sensor data, etc. Preferably, the portable device would include a radio (any type of communication link such as GPRS or Wi-Fi) to relay audio or data for monitoring friendly to friendly communications or radio broadcasts (e.g. group "walkie talkie" functions). In a preferred form, the portable device is a GPS equipped cell phone and can be used to communicate with a central server (e.g., command center) and other devices, for example, text commands.

Unknowns meeting certain criteria might be selectively displayed. For example, the criteria could be based on the social information, e.g. displaying all unknowns meeting criteria "white male seeking Tolstoy loving cowgirl." A user can optionally elect whether the user wants to be included as an unknown for other people having such devices and under what circumstances the user will be depicted as an unknown with certain interests. That is, a user can elect to not participate, participate only with selected friends or publish widely selected criteria to all participants. For example, the published criteria might be "destination—Stones Concert" or "seeking male Tango partners for Club Crud."

In "my view," for example, the portable device might selectively display only information to the user for unknowns or friendlies within a certain range. Alternatively, the user might want to follow a particular friendly or unknown continuously, e.g. follow friend named Jill, with selectable views (overheard, zoom, head). In any of these modes, the user could zoom, pan or tilt as described above, freeze, slow motion, replay, etc.

While the preferred embodiment is described in the context of a social networking situation such as that shown in FIGS. 8-10, it is easily seen how the system and method of the present invention is applicable to a wide variety of personal networking situations, such as tracking or finding children in a crowd or meeting a businessman for lunch. For example, a logistics function (in a crowd) might use the portable device while accompanying a group on a trip. Information on the position of unknowns or friendlies can be supplied from a variety of sources—such as optical or infrared triangulation from a number of users to acquire the position data. Once the position information of each participant (unknown or friendly) is gathered or approximated, the information is distributed to the user based on the user's and participant's desires. As may be surmised from the NASCAR analogy above, the user might determine the angle or view of the graphic rendering, the tilt, pan or zoom of the graphic depiction, the format of the presentation, i.e. graphic of the region of action or a tabular summary of all participants or one participant, statistics for another user, etc.

A prime advantage of the applicability of the present invention to personal networking situations is the ability to determine the position of and identify all participants. For example, with current E911 technology a cell phone can be fitted with a GPS device and is accurate within 50 meters permitting users to only know a friend is in the vicinity. The present invention contemplates a portable device accurate with WAAS and with location solving algorithms to less than 5 meters and with processing at a central server to submeter accuracy even in urban canyons or indoors. While the preferred embodiment contemplates obtaining participant location information via GPS, other types of location determination sensors are possible, such as proximity sensors, radar or radio triangulation.

While the portable device of the preferred embodiment is a cell phone with GPS, other types of gaming devices, PDA, and personal devices with radio (GPRS or Wi-Fi) may equally be used and adapted to personal networking situations. Further, although the preferred embodiment contemplates broadcasting participant location information to authorized users and graphics rendering performed on the handheld devices, the rendering load of the data might be distributed. I.e. some of the graphics pipeline for the rendering could be accomplished at the server before transmission. However, rendering technology is rapidly advancing and becoming increasingly realistic with advances in game technology and as the processing power of the portable device increases and the rendering technology develops, it is anticipated that most of the graphics rendering can be performed at the portable device.

DESCRIPTION OF PREFERRED EMBODIMENTS

Figure 1:
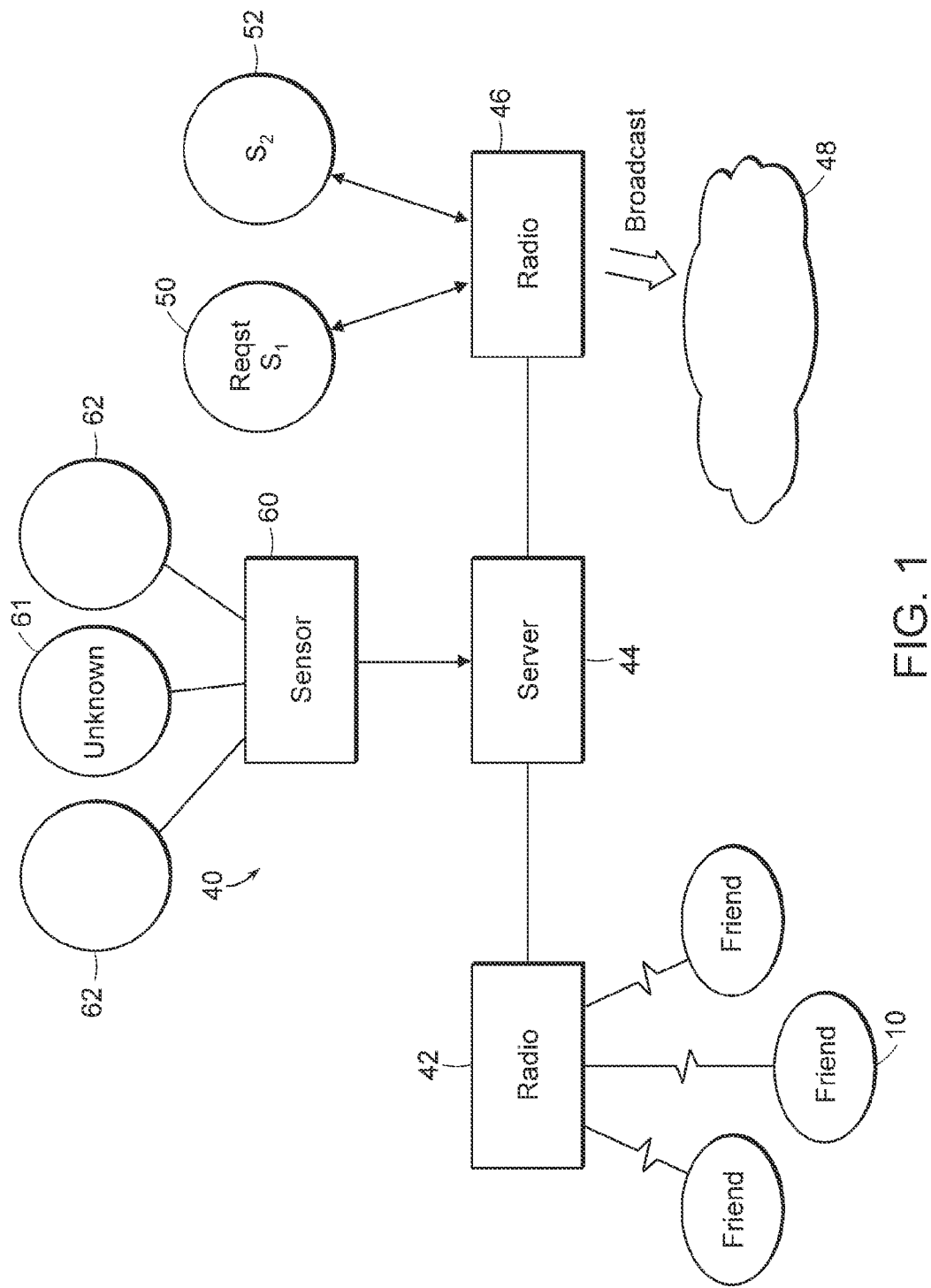
FIG. 1 is a block diagram of the network.

In FIG. 1, a depiction of the network 40 is shown. The friendlies 10 communicate with a radio base station 42 preferably using a cell phone network although other radios could be used (encrypted or secured if desired). The server 44 stores the position data of each friendly 10 communicated to the base station 42, and other pertinent data such as social information, etc. Ideally, the server 44 can also digitally store the voice communications of interest and images of various scenes of possible interest, i.e., other friendlies. Of course, the server 44 can store direction and messages as well for delivery to friendlies 10. The server 44 can also be used for authentication of portable devices 20 and enable selectable requests from friendlies (i.e. social information requests).

In some applications, the participants might broadcast location information directly to other friendlies, i.e. without an intervening server e.g. Wi-Fi if so equipped. The radio 46 is used to communicate on a broadcast or relay basis to other social networking participants 48—here using a GSM tri-band or Wi-Fi, the GPS position information of the friendlies 10 or requests (encrypted or secured if desired). The devices 20 in the hands of the other social networking participants 48 processes the position information to render the views illustrated for example in FIGS. 8-10. In FIG. 1, unknowns meeting a first criteria are depicted as 61, while unknowns meeting a second criteria are identified as 62. The first criteria might be all those whose destination is the UT/Oklahoma football game while the second criteria is all red-headed females taller than 5'6". Such criteria can be arbitrary and encompass practically any attribute of the user or social information.

In the preferred embodiment, friendly participants will carry a GPS enabled cell phone device 20 which permits tracking of many, if not all, of the friendlies. Unknowns will typically be detected and tracked using GPS enabled cell phones as well. Each participant will preferably determine their level of participation, both what information they want to publish and receive. For example, a participant might choose to publish and receive location information only confined to a predetermined group of friends or an individual. A participant might choose to publish location information and personal social data to all users within a geographic area or to those of a particular group (e.g. group defined as "destination—Stones concert.") A participant might choose to receive location and data from any participants within a defined group and publish information to the network only to those "seeking dance partners." The combinations are manifold based on identity and social information.

A number of different sensors and technologies can be used for tracking or augmenting the GPS information. This might be particularly useful indoors or in urban canyons. For example, Wi-Fi (which includes Wi-Max) and Ultrawide band based timing can be used for tracking locations. Additionally, ElectroOptical/Infrared (EO/IR) and radar surveillance sensor technologies and systems have been deployed for detection, classification, and tracking of personnel, vehicles, objects and materials such as explosives, drugs, and contraband hidden on persons, and in baggage, vehicles, and shipping containers, using EO/IR and Radar technologies and systems. Such systems include passive and active visible and infrared imagers, passive and active millimeter wave imagers (i.e. holographic radar, real aperture radar, synthetic aperture radar), acoustic imagers and x-ray imagers related technologies (i.e., active radar, ESM bistatic radar, etc.), infrared and low-light systems, and algorithms to process individual and multiple sensor data. The following patents relate to different types of sensors and technologies for detection, classification, and tracking of personnel. U.S. Pat. Nos. 7,046,187; 6,987,560; 6,922,145; 6,856,272; 6,754,368; 6,437,727; and 6,061,014 (herein incorporated by reference). In one mode, the friendlies can mark unknown or foes (signed by EO, optical, or acoustic) which gives an angle to the server 44. From a number of angles the server can compute approximate location by triangulation.

While the preferred embodiment contemplates most processing occurring at device 20, different amounts of preprocessing of the position data can be processed at the server 44. For example, the participant information can be differentially corrected at the server (using e.g. either WAAS or a local area differential correction) or even information post-processed with carrier phase differential to achieve centimeter accuracy. Further, it is anticipated that most of the graphics rendering can be accomplished at the portable device 20, but an engineering choice would be to preprocesses some of the location and rendering information at the server 44 prior to broadcast. The information sent to a portable device 20 might include any of the social information and in addition, photographs and personal information and attributes linked from other social networking data repositories.

Figure 2:
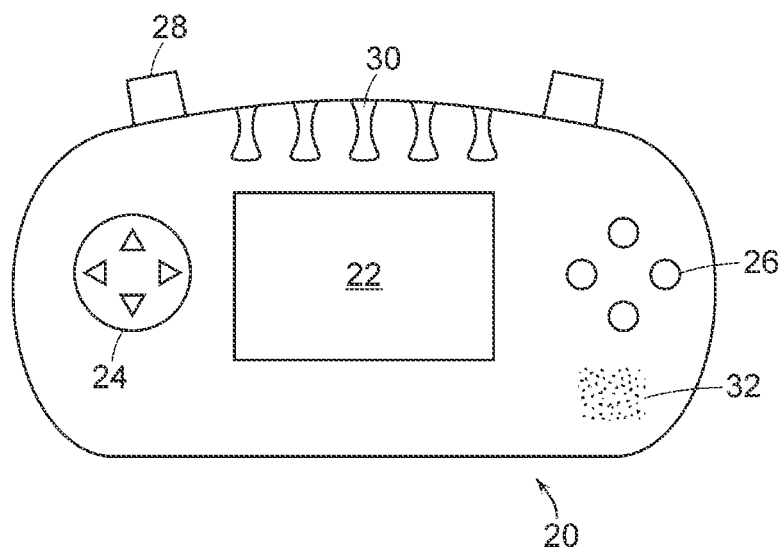
FIG. 2 is a depiction of the portable device of a preferred embodiment.

FIG. 2 is a front elevation of one form of a portable device 20 carried by the spectators. The depiction is of a gaming device manufactured and sold by Gizmondo, Inc., but other such devices having similar functionality can be substituted. The device 20 includes an LCD screen 22, and an 8 way directional pad 24. Face buttons 26 are near the screen, while triggers 28 are on top of the device 20 as shown. Functional buttons 30 and speaker 32 complete the functional items in the view of FIG. 2. Not shown are the SD card slot, USB or power ports, or a camera. The Gizmondo was powered by a 400 MHz ARMS processor and has a 2.8 inch 320×240 pixels TFT screen and an NVIDIA 128 bit GeForce 3D 4500 GPU featuring a programmable pixel shader, hardware transform engine, and 1280 KB of embedded memory.

While the device 20 of FIG. 2 uses an ARM 9 processor and Sirf GPS chipset, substitutions can be readily made (e.g. uBlox GPS chipset). The preferred primary communications radio is GPS tri-band for GPRS but other communication links are easily used. GPRS is a connectivity solution based on Internet Protocols that supports a wide range of enterprise and consumer applications. With throughput rates of up to 40 kbit/s, users have a similar access speed to a dial-up modem, but with the convenience of being able to connect from anywhere. A WiFi communications link can alternatively be used, and encrypted if desired, e.g. using Wired Equivalent Privacy or WEP. Sony, Nintendo, and Playstation all make or intend to make premium game consoles with embedded WiFi. Of course, WiFi outdoors has range issues (although this can be several kilometers with improved antennas and line of sight, particularly at the older 900 MHz bandwidths) and power issues which might make WiFi unsuitable for some applications, although the Wi Max version of WiFi may solve many of these problems.

Figure 3:
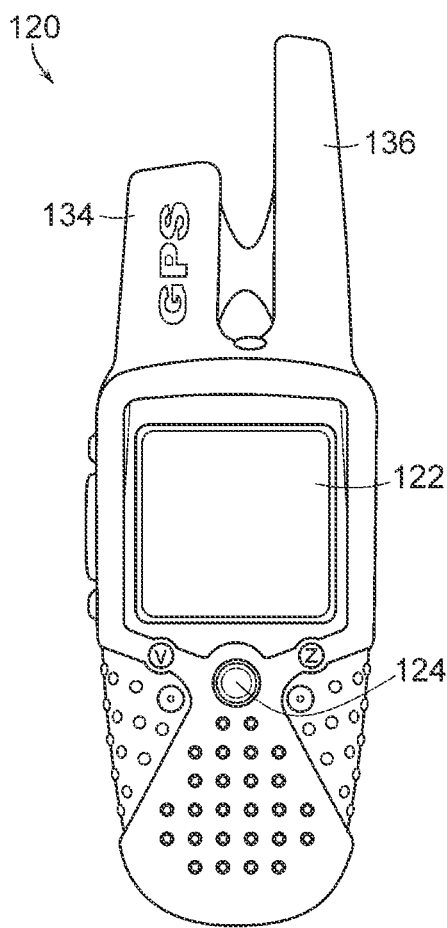
FIG. 3 is a perspective of an alternative embodiment of the portable device, resembling a PDA or a cell phone.
Figure 4:
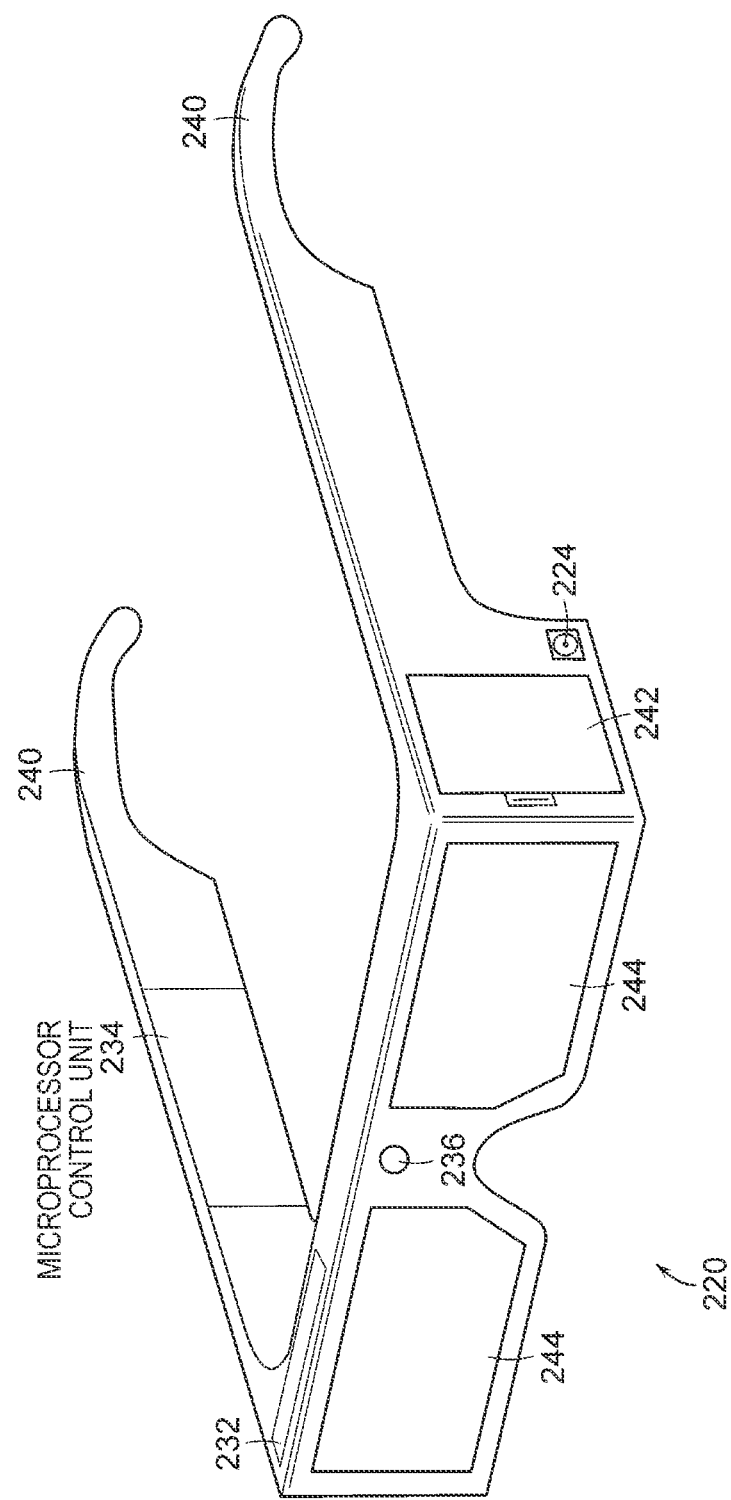
FIG. 4 is a perspective of a portable device where the functionality is built into glasses or goggles worn by the user.
Figure 5:
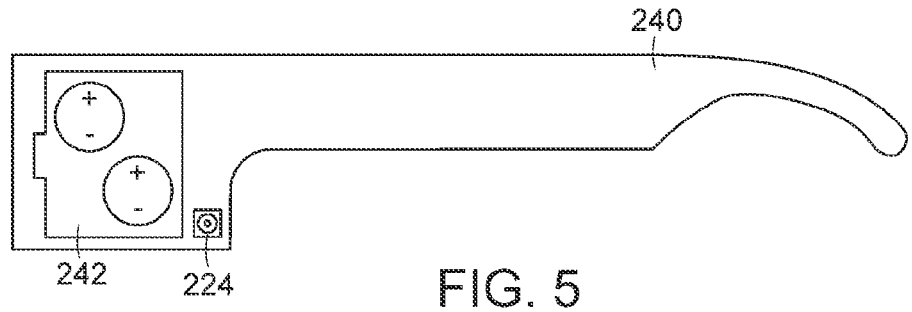
FIG. 5 is a side view of the glasses of FIG. 4.
Figure 6:
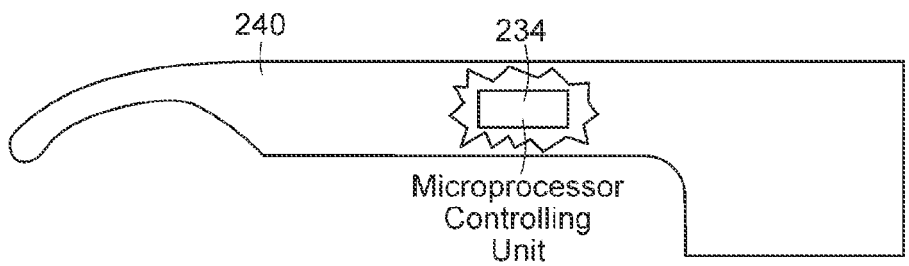
FIG. 6 is a side view of the glasses of FIG. 4 from the other side.
Figure 7:
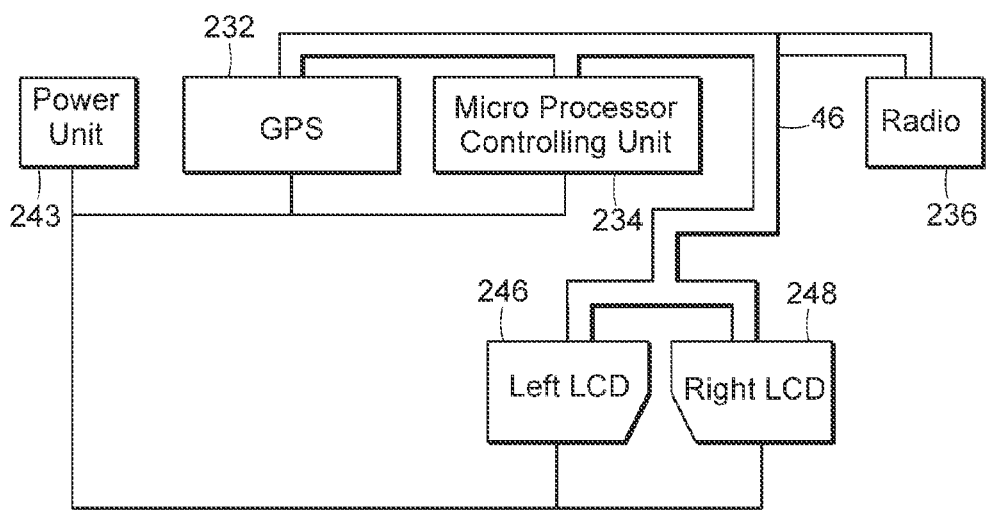
FIG. 7 is a block diagram of the functionality of the glasses of FIG. 4.

FIG. 3 depicts a preferred form of the portable device 120 carried by the users—namely a cell phone. The portable device 120 of FIG. 3 includes a GPS/antenna 134, communications antenna and radio 136, a display 122, and a directional pad 124. Other alternatives for a portable device are possible. For example, the portable device 220 of FIG. 4 is in the configuration of glasses or goggles and includes a GPS and patch antenna 232, microprocessor 234, radio 236. Controls, such as the directional pad 224, are on the side frames (opposite side shown in FIG. 6). Batteries are stored in compartment 242. The displays are transparent LCD's as at 244 and, in particular, are LCD's left 246 and right 248 illustrated in FIG. 7. Examples of such a device are the MyVue headset made by MicroOptical Corp. of Westwood, Mass. (see, U.S. Pat. No. 6,879,443). In addition to the Gizmondo type device of FIG. 2, in the near term gaming consoles with GPS and a radio are the best alternatives, such as made by Sony PSP or N Gage OD. However, PDA and cell phone form factors will be viable long term as portable devices, such as Mio A701, HP iPaQ, and Siemens.

In a particularly preferred form, the cell phone 120 of FIG. 3 may include Bluetooth communication capability. The user would wear glasses similar to those depicted in FIG. 4 with Bluetooth capability. In this manner, the glasses would be simple devices for displaying the desired information received from the cell phone 120. That is, the cell phone 120 provides the location and computational capability with the glasses simply providing an additional augmented reality capability to cue to a friendly or unknown.

As used herein, GPS is meant to include all of the current and future positioning systems that include satellites, such as the U.S. Navistar, GLONASS, Galileo, EGNOS, WAAS, MSAS, etc. The accuracy of the positions, particularly of the participants, can be improved using known techniques, often called differential techniques, such as WAAS (wide area), LAAS (local area), Carrier-Phase Enhancement (CPGPS), Wide Area GPS Enhancement (WAGE), or Relative Kinematic Positioning (RKP). Of course, the positional degree of accuracy is driven by the requirements of the application. In the NASCAR example, two meter accuracy provided by WAAS would probably be acceptable. In personal networking as contemplated herein, 5 meter accuracy is believed sufficient in most situations and can be achieved through combinations of antenna and receiver design, differential correction using WAAS or LAAS or processing corrections at the central server. For example if the antenna and receiver design of the GPS enabled cell phone yields 15 meter accuracy, WAAS correction might bring the accuracy to 5 meters and processing at the server might yield additional improvements to 2 meters. Such central server corrections can be applied in near real time using local area corrections using standard techniques such as vector corrections or pseudorange corrections.

Figure 8:
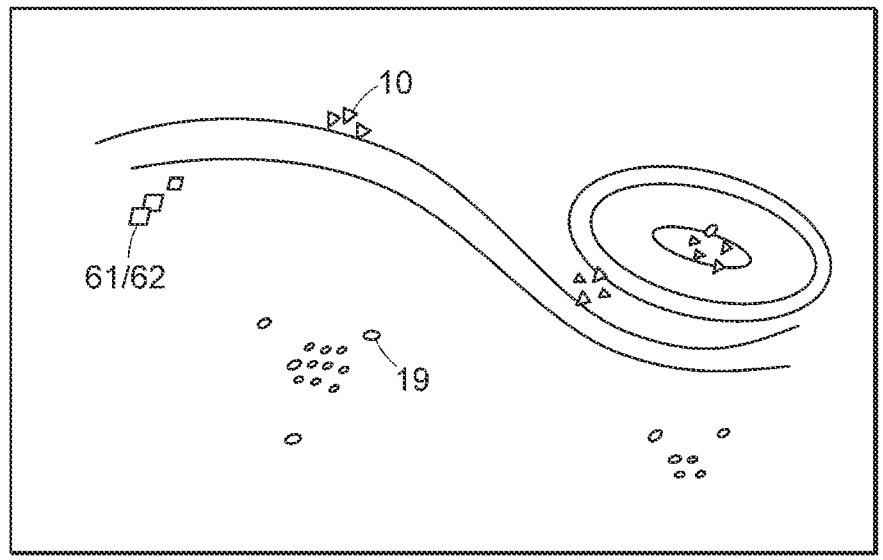
FIG. 8 is a diagram of a screen short from the portable device showing an overhead view of all participants, friendlies and unknowns, in a region of interest.
Figure 9:
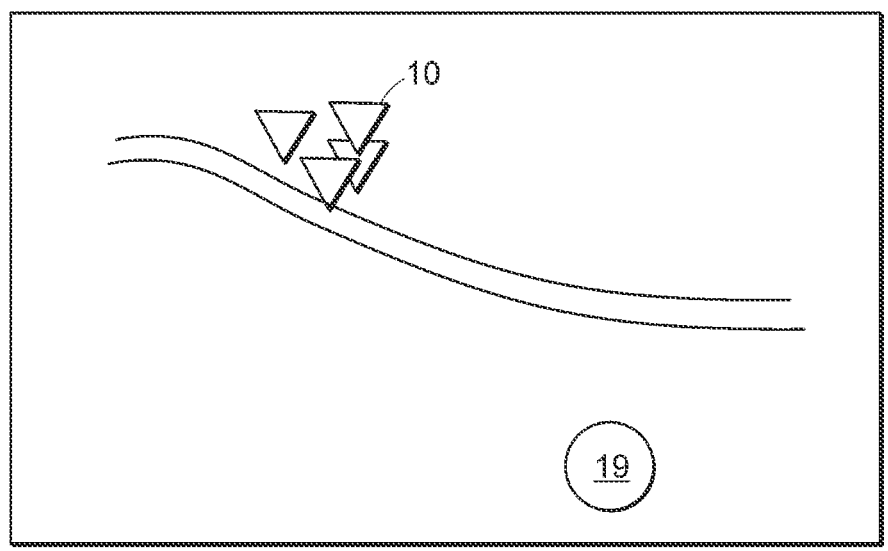
FIG. 9 is a diagram of a screen shot from the portable device showing an enlarged, overhead view of a particular set of participants from FIG. 8.
Figure 10:
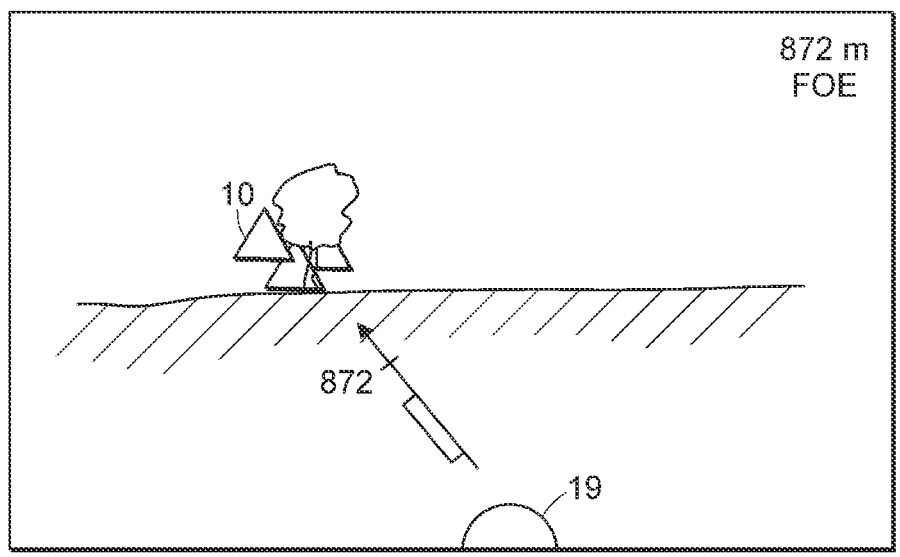
FIG. 10 is a diagram of a screen shot from the portable device showing the participants of FIG. 9, but from a lateral view and depicting information on the nearest friends.

Discussing FIGS. 8-10 in conjunction, FIG. 8 depicts friendlies 10/11, unknowns 61 and 62, and user 19 operating in an area of interest 12. In FIG. 9, the user 19 is at the base of a ridge and FIG. 10 is a rendering from the perspective of user 19. In FIG. 9, the user 19 has tilted upwardly his view so that he has an oblique angle view of friends 10 of FIG. 8. FIG. 8 is of a view of the same area 12 at the same moment in time as FIGS. 9-10, but the view is "zoomed" outwardly changing the scale and allowing to see more of the participants in area 12. FIG. 10 shows an augmented reality view where even if friends 10 cannot be seen visually (e.g., night, weather, crowds, terrain, distance, buildings, etc), their location is depicted. Range, ID, and other cuing information is also depicted in FIG. 10. While the display of area 12 in FIGS. 8-10 is in real time, the user 19 could alternatively obtain from the server a "SimulCam" using technology such as available from Dartfish where each unknown or foe is superimposed at a certain time into a time progression over a previous position to show movement.

Graphics

The graphics generated on the screen 22 can be 2D graphics, such as geometric models (also called vector graphics) or digital images (also called raster graphics). In 2D graphics, these components can be modified and manipulated by two-dimensional geometric transformations such as translation, rotation, scaling. In object oriented graphics, the image is described indirectly by an object endowed with a self-rendering method—a procedure which assigns colors to the image pixels by an arbitrary algorithm. Complex models can be built by combining simpler objects, in the paradigms of object-oriented programming. Modern computer graphics card displays almost overwhelmingly use raster techniques, dividing the screen into a rectangular grid of pixels, due to the relatively low cost of raster-based video hardware as compared with vector graphic hardware. Most graphic hardware has internal support for blitting operations and sprite drawing.

Preferably, however, the graphics generated on screen 22 are 3D. OpenGL and Direct3D are two popular APIs for the generation of real-time imagery in 3D. (Real-time means that image generation occurs in 'real time', or 'on the fly') Many modern graphics cards provide some degree of hardware acceleration based on these APIs, frequently enabling the display of complex 3D graphics in real-time. However, it's not necessary to employ any one of these to actually create 3D imagery. The graphics pipeline is advancing dramatically, mainly driven by gaming applications.

3D graphics have become so popular, particularly in computer games, that specialized APIs (application programmer interfaces) have been created to ease the processes in all stages of computer graphics generation. These APIs have also proved vital to computer graphics hardware manufacturers, as they provide a way for programmers to access the hardware in an abstract way, while still taking advantage of the special hardware of this-or-that graphics card. These APIs for 3D computer graphics are particularly popular:

OpenGL and the OpenGL Shading Language
OpenGL ES 3D API for embedded devices
Direct3D (a subset of DirectX)
RenderMan
RenderWare
Glide API
TruDimension LC Glasses and 3D monitor API There are also higher-level 3D scene-graph APIs which provide additional functionality on top of the lower-level rendering API. Such libraries under active development include:
QSDK
Quesa
Java 3D
JSR 184 (M3G)
NVidia Scene Graph
OpenSceneGraph
OpenSG
OGRE
Irrlicht
Hoops3D Photo-realistic image quality is often the desired outcome, and to this end several different, and often specialized, rendering methods have been developed. These range from the distinctly non-realistic wireframe rendering through polygon-based rendering, to more advanced techniques such as: scanline rendering, ray tracing, or radiosity. The rendering process is computationally expensive, given the complex variety of physical processes being simulated. Computer processing power has increased rapidly over the years, allowing for a progressively higher degree of realistic rendering. Film studios that produce computer-generated animations typically make use of a render farm to generate images in a timely manner. However, falling hardware costs mean that it is entirely possible to create small amounts of 3D animation on a small processor, such as in the device 20.

While full 3D rendering is not possible with the device 20 described herein, advances in processing and rendering capability will enable greater use of 3D graphics in the future. In 3D computer graphics, the terms graphics pipeline or rendering pipeline most commonly refer to the current state of the art method of rasterization-based rendering as supported by commodity graphics hardware. The graphics pipeline typically accepts some representation of a 3D scene as an input and results in a 2D raster image as output.

Requests

Special requests from user 19 or friendlies 10/11 can be made to the server 44, such as for images of a particular scene or audio of a particular friendly 10/11, social status, support requests, etc. This function is shown as at 50, 52 in FIG. 1.

While the preferred embodiment has been described in the context of a user in physical proximity to other group participants, the use of the portable devices 20 at remote locations is equally feasible and indeed the device 20 need not be portable in alternative embodiments. For example, the device 20 can be a TV set top box while watching an event on TV. Further, the device could be a networked computer watching streaming video with the participant location and other information streaming over a communication link (e.g. the internet).

What is claimed:

1. A method for participating in a mobile social networking situation, comprising:
   a. selecting on a portable device accompanying a user the user's desired level of participation in a social networking situation, which includes a defined criteria said defined criteria not including position;
   b. wirelessly logging into a server connected to a communication network by said user using said portable device;
   c. wirelessly communicating the user's desired level of participation in said social networking situation to said server;
   d. communicating to said server a participant's election of social information;
   e. wirelessly publishing the user's GPS location in a geographic area of interest to said server;
   f. wirelessly communicating to said user said participant's position and identity information stored on said server, where said participant is located in said geographic area of interest and said participant social information meets said user defined criteria; and
   g. displaying on said portable device accompanying said user said participant's position and identity, wherein said display on said portable device is a perspective view of said geographic area of interest and said other participant's position is displayed, and wherein said perspective view includes an augmented reality view of said geographic area of interest.

2. The method of claim 1, wherein said defined criteria is social information.

3. The method of claim 2, wherein said social information is one or more criteria selected from the group comprising: destination, cash available, time available, meeting desires, introduction desires, partner status, gender, race, interest, group affinity, culture affinity, music affinity, or a physical attribute.

4. The method of claim 3, wherein said participant information includes participant social information.

5. The method of claim 1, including communicating a second criteria for identifying other participants.

6. The method of claim 1, wherein said display on said portable device includes a plan view of said geographic area of interest and said other participant locations are displayed.

7. The method of claim 1, wherein said geographic area of interest is within a certain range from said user's GPS location.

8. The method of claim 1, wherein said desired level of participation includes allowing access to said user's location to a predetermined circle of friends having information stored on said server.

9. The method of claim 1, wherein said desired level of user participation includes publishing said user's location and identity only to other participants connecting to said server that meet another criteria where said other criteria does not include user location.

10. The method of claim 9, wherein said other criteria is a participant destination and a user's location and identity are published only to a participant having the same destination.

11. A method for identifying mobile social network participants in a networking situation to a mobile user, comprising:
    recording said user's location in a geographic area of interest on a server;
    communicating first and second criteria to said server, said criteria including wirelessly communicating said user's desired level of participation to said server, where said desired level of participation comprises social information, but does not include position, and is selected for the networking situation, and includes i) a first criteria for publishing the user's identity to social network participants and ii) a second criteria for receiving the location and identity of social network participants,
    wirelessly communicating a participant's desired level of participation to said server, where said desired level of participation comprises social information, but does not include position, and is selected for the networking situation, and includes i) a first criteria for publishing the participant's identity to social network participants and ii) a second criteria for receiving the location and identity of social network participants;

recording a location of said social networking participant on said server;

identifying said social network participant if said location is within said geographic area of interest and said participant first criteria meets said user second criteria; and communicating said identified social network participant from said server to a portable device accompanying said user, wherein the participant location and identity is displayed on said portable device.

12. The method of claim 11, wherein said display on said portable device is a plan view of said geographic area of interest and said other participant locations are displayed.

13. The method of claim 11, wherein said display on said portable device is an augmented reality, perspective view of a portion of said geographic area of interest and said other participant location is displayed.

14. The method of claim 11, wherein said second criteria is social information.

15. The method of claim 14, wherein said social information includes one or more of destination, cash available, time available, meeting desires, introduction desires, partner status, gender, race, interest, group affinity, culture affinity, music affinity, or a physical attribute.

16. The method of claim 11, wherein said geographic area of interest is a certain range from a user location stored on said server.

17. The method of claim 11, wherein said first criteria is a circle of friends of said user identified on said server.

18. A portable device accompanying a user participating in a network situation, comprising:
   a GPS module for determining said user's location in a geographic area of interest;
   a user interface for accepting said user's desired level of participation in said network situation including first defined criteria for publishing said user's identity and second defined criteria for receiving another participant's information;
   a radio for publishing said user's GPS location and defined criteria to a communication network having a server connected thereto for recording said GPS location and said defined criteria selected by the user, wherein said defined criteria is social information;
   a radio for receiving another participant's information stored on said server, where said another participant is located in said geographic area of interest and meet said second defined criteria, and said information received includes location; and
   a display coupled to said radio and operable to depict the other participants location in said geographic area of interest, wherein said display includes an augmented reality perspective view of said geographic area of interest and the background includes an artificial reality rendering of the area of interest.

19. The device of claim 18, wherein said display includes a plan view of said geographic area of interest.

20. The device of claim 18, wherein said display includes an augmented reality perspective view of said geographic area of interest and the background is a photographic image of the area of interest.

21. The device of claim 18, including controls wherein said user can elect to view at least a portion of said other participant's social information stored on said server.

22. The device of claim 18, wherein said device includes the form factor of glasses worn by said user.

23. The method of claim 11, including displaying on said portable device at least some of said participant first criteria.

24. The method of claim 11, including wirelessly accessing social information associated with said identified social network participant and communicating said social information to said portable device.

25. The method of claim 1, wherein said identity is a highlight of the participant's position on a display of the portable device.

26. The method of claim 1, including linking to a social network and displaying information stored therein related to said participant.

27. The method of claim 26, wherein said social network information includes one or more participant photos, personal information or physical attributes.

28. A portable device accompanying a user participating in a network situation, comprising:
   a GPS module for determining said user's location in a geographic area of interest;
   a user interface for accepting said user's desired level of participation in said network situation including first defined criteria for publishing said user's identity and second defined criteria for receiving another participant's information;
   a radio for publishing said user's GPS location and defined criteria to a communication network having a server connected thereto for recording said GPS location and said defined criteria selected by the user, wherein said defined criteria is social information;
   a radio for receiving another participant's information stored on said server, where said another participant is located in said geographic area of interest and meet said second defined criteria, and said information received includes location; and
   a display coupled to said radio and operable to depict the other participant's location in said geographic area of interest, said device including the form factor of glasses worn by the user, wherein said display on said portable device is a perspective view of said geographic area of interest and said other participant's position is displayed, and wherein said perspective view includes an augmented reality view of said geographic area of interest.

29. The device of claim 28, including controls wherein said user can elect to view at least a portion of said other participant's social information stored on said server.

30. The device of claim 28, wherein said device comprises glasses worn by said user connected to a cell phone accompanying the user.

31. The device of claim 28, wherein said social information includes one or more of destination, cash available, time available, meeting desires, introduction desires, partner status, gender, race, interest, group affinity, culture affinity, music affinity, or a physical attribute.

* * * * *